United States Patent [19]
Shaw et al.

[11] Patent Number: 5,209,821
[45] Date of Patent: May 11, 1993

[54] APPARATUS FOR REMOVING VOLATILES FROM, OR DEHYDRATING, LIQUID PRODUCTS

[75] Inventors: Alexander J. Shaw, Vancouver, Canada; Jay S. Marks, Battle Ground; Hayes E. Gahagan, Indianapolis, both of Ind.

[73] Assignees: Purdue Research Foundation; JSDC, Ltd., West Lafayette, Ind. ; part interest to each

[21] Appl. No.: 299,399

[22] Filed: Jan. 23, 1989

Related U.S. Application Data

[63] Continuation-in-part of Ser. No. 28,619, Mar. 20, 1987, abandoned, which is a continuation-in-part of Ser. No. 861,041, May 8, 1986, abandoned, which is a continuation-in-part of Ser. No. 732,444, May 9, 1985, abandoned.

[51] Int. Cl.⁵ .............................................. B01D 1/18
[52] U.S. Cl. ................................. 159/4.01; 34/57 R; 34/191; 127/61; 127/63; 159/16.1; 159/43.1; 159/48.1; 159/900; 159/DIG. 28; 202/236
[58] Field of Search ............. 159/4.01, DIG. 28, 16.1, 159/43.1, 900, 48.1; 127/61, 63; 204/157.15, 157.62; 202/236; 426/465, 238; 34/57 R, 191

[56] References Cited

U.S. PATENT DOCUMENTS

| | | | |
|---|---|---|---|
| 2,796,734 | 6/1957 | Bodine, Jr. | 60/249 |
| 2,953,457 | 9/1960 | Sanna | 159/DIG. 26 |
| 3,175,299 | 3/1965 | Boucher | 127/63 |
| 3,409,447 | 11/1968 | Jeppson | 159/DIG. 26 |
| 3,462,955 | 8/1969 | Lockwood et al. | 60/249 |
| 3,706,599 | 12/1972 | Woodruff et al. | 127/62 |
| 3,831,288 | 8/1974 | Stribling et al. | 159/DIG. 26 |
| 3,956,009 | 5/1976 | Lundquist et al. | 127/61 |
| 4,334,366 | 6/1982 | Lockwood et al. | 426/465 |
| 4,549,053 | 10/1985 | Haugh | 159/DIG. 26 |
| 4,667,654 | 5/1987 | Thaler et al. | 127/65 |

Primary Examiner—Virginia Manoharan
Attorney, Agent, or Firm—Christie, Parker & Hale

[57] ABSTRACT

Apparatus are set forth for particularly dehydrating products such as corn syrups, fruit and vegetable extracts, dairy products, or other temperature-sensitive or hard-to-handle products. The apparatus include using a pulse combustor to generate a hot, turbulent, gaseous environment in a dehydration chamber and spraying the feedstock into the chamber. As the feedstock droplets travel through the chamber, they are dehydrated and thereafter collected by suitable devices. Temperature and feedstock residence time in the chamber are controlled to prevent product degradation. Where the dehydrated product is hygroscopic, processing aids may be added to control hygroscopicity.

6 Claims, 8 Drawing Sheets

HFCS

APPARATUS FOR REMOVING VOLATILES FROM, OR DEHYDRATING, LIQUID PRODUCTS

CROSS-REFERENCE TO RELATED APPLICATIONS

This application is a continuation-in-part of application Ser. No. 07/028,619, filed Mar. 20, 1987, entitled "METHOD AND APPARATUS FOR REMOVING VOLATILES FROM OR DEHYDRATING LIQUID PRODUCTS" (now abandoned), which is a continuation-in-part of application Ser. No. 861,041, filed May 8, 1986, entitled "METHOD AND APPARATUS FOR REMOVING VOLATILES FROM OR DEHYDRATING LIQUID PRODUCTS" (now abandoned), which is a continuation-in-part of application Ser. No. 732,444, filed May 9, 1985, entitled "METHOD AND APPARATUS FOR DEHYDRATING HIGH-FRUCTOSE CORN SYRUP" (now abandoned).

FIELD OF THE INVENTION

This invention relates to methods and devices for removing volatile components from less volatile components in a fluid. More particularly, it relates to methods and devices for drying or dehydrating products. Still more particularly, it relates to methods and devices for dehydrating temperature-sensitive, relatively non-volatile products, such as food products, including corn syrups, high-fructose corn syrups, corn syrup blends, citrus and vegetable pulps and juices and extracts and concentrations thereof, proteins, and the like, and for handling such products. It also relates to the dry products produced pursuant to the methods.

BACKGROUND OF THE INVENTION

Techniques have been devised, and equipment has been used, to remove, in a liquid carrier, volatile components from less volatile components. For example, processing, disposal, or handling parameters may require that solvents (volatile components) be removed from those less volatile components in a chemical composition. Where the volatile component to be removed from the less volatile solid components is water, the process is referred to as drying or dehydrating.

With specific reference to drying, it has been known to use spray-drying, where the water is flash-evaporated, or to use mechanical dryers, such as evaporators. For example, U.S. Pat. No. 2,887,390 to Coulter et al discloses the use of a venturi tube for delivering hot drying gas to a drying chamber. Feedstock, such as evaporated milk, is supplied by "liquid delivery means" to the throat of the venturi tube, and preferably "slightly upstream" from the narrowest portion of the throat. With this system, the rate of delivery of feedstock must be limited to avoid impingement milk particles on the interior surfaces of the venturi tube. Moreover, the feedstock is discharged into the venturi where the gas flow is laminar, rather than turbulent. These two factors limit the capacity and efficiency of drying apparatus constructed and operated in accordance with the Coulter et al disclosure. In addition, the Coulter et al system depends entirely on the gas flow to atomize the feedstock, resulting in droplets being formed at irregular rates and in a wide range of sizes.

While the above techniques are satisfactory in some applications, for certain products or applications these methods are not economical, result in degradation of the product, or simply cannot be used. A specific group of products which has evaded efforts for economical dehydration includes corn sweeteners, including high-fructose corn sweeteners (HFCS), citrus and vegetable products, xanthan gum, and the like.

Caloric sweeteners are typically either sucrose, derived from sugar cane and beets, or dextrose or fructose sweeteners, derived from fruit and corn. When the starch present in corn is subjected to hydrolysis, dextrose, and higher saccharides are produced. Such corn sweeteners are often referred to by their DE (dextrose equivalent) and usually fall in the range of between 36 DE and 95 DE corn syrups. If the dextrose and higher saccharides are subjected to isomerization via a process including certain enzymes, dextrose, fructose and higher saccharides are produced. A typical example after isomerization of the product may be represented by 42% fructose based upon dry solids content. This product can further be refined via chromatographic separation to yield a 90-95% or higher percentage fructose product. These high-fructose corn syrups (HFCS) may be used as sweeteners, or blended with corn sweeteners (dextrose sweeteners) for whatever purposes.

The use of HFCS has grown, on a per capita basis, from 0.7 lb. in 1970 to 29.8 lbs. in 1983. This rise in the use of HFCS is based to a great extent on the almost complete switch over to HFCS from sugar by the carbonated beverages industry. Since HFCS is sweeter, less is used, and, accordingly, cost savings can be realized. However, the use of HFCS has leveled off recently, indicating a mature market. HFCS consumption would increase, and compete with sugar, if HFCS is available in a dry, amorphous, powder form. This invention provides such a product.

As stated above, HFCS is derived from corn and is typically available between 42% and 90% fructose (dry weight basis). The syrups can vary from 71% to 80% dry solids, as an example. Sweetness of these HFCS products closely approximate that of sucrose. One processor has produced crystalline fructose (100% fructose dry basis) from HFCS for specialty markets. However, due to the processing required, the crystalline fructose is many times more expensive than cane or beet sugar and, hence, has failed to overtake sugar in many markets. Dry, flowable 42%, 55%, and/or 90% HFCS corn syrup solids, or blends thereof with dextrose corn syrup solids, economically produced, would displace sugar in many markets. For example, for baked foods, such as those made from cake mixes, dry, powdered HFCS or blends thereof could provide sweetness and, because HFCS is hygroscopic, would desirably retain moistness for the prepared food. Of course, this is by way of example only, since a dry, flowable, amorphous (noncrystal) HFCS sweetener or blend could enter many other markets.

Attempts have been made to dry corn syrups and HFCS. However, to date, such attempts have failed, or have, for whatever reason, including economics, been discontinued. For example, Lundquist, Jr. et al, U.S. Pat. No. 3,956,009, discloses a method for drying fructose solutions using a spray-drying technique in which solid crystalline fructose particles are interjected as feedstock into the product. HFCS is a particularly troublesome product. It is highly temperature-sensitive. High temperatures can degrade the fructose and caramelize the product. Moreover, due to its hygroscopic nature, it is difficult to handle.

SUMMARY OF THE INVENTION

This invention provides improved methods and apparatus for removing volatiles from, or dehydrating, a wide range of feedstocks, without degradation of the product, and for handling the resulting product. The invention also provides new products.

One aspect of the present invention includes the creation of a hot, turbulent, gaseous environment and subjecting the feedstock to the environment for a period of time necessary for removal of volatiles, or for dehydration. While the description hereinafter set forth refers to the methods, apparatus, and products as being related to, or the result of, dehydration, i.e., removal of water, the methods, apparatus, and the products produced thereby may be directed toward, or the result of, removal of other volatiles, such as organic solvents or the like. The product to be dehydrated is introduced into the environment as small droplets, particles, or pieces to maximize the surface area, the water moving to the surface of each particle and evaporating therefrom by virtue of the hot, turbulent, gaseous environment, which promotes rapid evaporation of volatiles.

In terms of apparatus, the presently preferred embodiment of this invention includes a drying chamber having an inlet and an outlet. A venturi tube mounted at the chamber inlet has a converging portion, a throat, and a diverging portion which discharges into the drying chamber. Means are provided for supplying a heated gas stream through the venturi tube into the chamber inlet. A spray nozzle with at least one discharge opening is mounted in the diverging portion of the venturi tube, and means are provided for supplying liquid to be evaporated to the spray nozzle at sufficient pressure and velocity to force droplets of liquid to leave the nozzle discharge opening and enter the gas stream substantially in the pattern of a cone. Preferably, the sprayed droplets are of relatively uniform size and in the range of 10 to 100 microns. Uniformity of drop size improves drying efficiency and product quality.

In the preferred form, the included angle of the cone sprayed from the nozzle is greater than the included angle of the diverging portion of the venturi tube, and the spray nozzle discharge opening is in the vicinity of where the diverging portion of the venturi tube discharges into the drying chamber so that the droplets enter a zone of high turbulence downstream from the venturi tube throat. Preferably, the apparatus is arranged so that the heated gas leaving the venturi tube creates flow conditions which cause the Reynolds number to exceed 3000.

In drying feedstock which is relatively viscous (say, greater than about 250 cps), the spray nozzle is preferably a two-phase unit, which uses a gas, such as air, to drive and initially atomize the feedstock leaving the spray nozzle discharge opening.

In terms of method, the presently preferred embodiment of the invention includes removing volatile components from less volatile components in a liquid-containing feedstock by passing a hot gas into a drying space having an inlet and an outlet. A turbulent zone is created in the gas in the drying space to cause the Reynolds number to exceed about 3000, and droplets of the feedstock are sprayed into the turbulent zone to vaporize volatile components from the less volatile components. Thereafter, the less volatile components are collected. Preferably, the turbulent zone is created by passing the hot gas through a venturi tube, which discharges into a relatively large volume of the drying space. Also in the preferred method, the spray droplets are in the range of 10 to 100 microns (Sauter mean diameter). Preferably, the materials dried in accordance with the preferred method of this invention include citrus juice and pulp, apple juice and puree, soap, xanthan gum, onion slurry, soy sauce, sodium and potassium benzoate, yeast and various other bacterial concentrates, milk, whey, high-fructose corn syrup, coffee, tomato products, lysine, corn sweeteners, enzymes, and gelatin.

In drying products which include fibrous matter, feedstock is first homogenized to facilitate spraying droplets into the hot, turbulent, gaseous environment.

Another form of the invention includes the steps of:
providing a chamber having an inlet and an outlet;
directing a hot gas through the inlet into the chamber, the gas passing through the chamber and exiting the chamber at the outlet;
particulating the feedstock into the chamber;
generating acoustical waves in the chamber, said hot gas and acoustical waves creating an environment to remove the volatile components from the feedstock; and
collecting the less volatile components at the outlet.

With specific reference to dehydrating high D.E. corn syrups, HFCS, and blends thereof, the method includes:
providing a vessel defining a chamber, the vessel having at one end an inlet and at the other end an outlet;
particulating the corn syrup as droplets having a mean diameter of about 2-50 microns into the chamber;
directing hot gas through the inlet into the chamber, the hot gas moving through the chamber to the outlet;
generating acoustical waves in the chamber to agitate the droplets, said droplets moving with the gas to the outlet, said hot gas and acoustical waves agitating the droplets for dehydration thereof; and
collecting the droplets as an anhydrous melt at the outlet.

With specific reference to dehydration of corn sweeteners, the methods and devices for producing acoustical waves to dry the corn sweeteners includes a pulse combustor having an inlet directed to discharge through the vessel inlet defined by an orifice into the chamber, the combustor having an outlet arranged to discharge into flow-directing means. The pulse combustor exhausts cyclicly at both the inlet and outlet to produce high-temperature gas on the order of 2000° F. and the following frequencies (octave bands) and sound pressures;
63 Hz–103 decibels (db)
125 Hz–144 db
500 Hz–140 db
1000 Hz–131 db
2000 Hz–124 db The combustor is contained within a closed housing, and, accordingly, the exhaust gases from the discharge encounter the flow-directing means and circulate through the housing to the orifice to pass therethrough with the discharge from the combustor inlet. To control the temperature of the gases entering the chamber, primary tempering air is brought in at the housing to mix with the exhaust gases at the orifice to produce gas temperatures in the range of 300° F. at the chamber adjacent the orifice.

The corn syrup product is sprayed into the 300° F. acoustical environment in droplets having a mean diameter of about 20 microns to thereby maximize the surface area for evaporation of moisture. The dispersed droplets move downwardly from the one end through the chamber due to gravity and the stream of pulsating exhaust gases from the combustor. When the droplets first encounter the high temperature, pulsating acoustical environment flash-drying of at least the outer surface of the droplets occurs. The pulsating exhaust gases and acoustical waves agitate and scrub the droplets to enhance drying thereof. To prevent burning and discoloration of the corn syrup, or insufficient drying of the droplets, the chamber is selected such that for a selected gas temperature, a suitable residence time, e.g., 0.4-10 seconds for the droplets, is obtained. It is to be noted that to obtain the desired dehydrated corn syrup solids without appreciable discoloration, degradation, or burning, the time-temperature relationship for the droplets is crucial. Too long an exposure to the hot gases can cause discoloration, burning, or degradation of the product, while too little time results in insufficient drying.

According to one embodiment, the drying chamber may be open throughout its length. In another embodiment, a coalescer is positioned at the chamber outlet to collect the dehydrated droplets and the product which has impinged upon and flows down the sides of the chamber to collect the dehydrated corn syrup melt. In still another embodiment, multiple-stage separation via a series of coalescers and demisters may be employed for complete removal of the products from the gases.

To control the temperature at the chamber outlet, secondary cooling air may be admitted to the chamber. The secondary cooling air should be selected to obtain temperatures on the order of 200° F., at which the corn syrup melt is still flowable while preventing burning, discoloration, or degradation of the product. In still a further embodiment, to prevent or reduce wall impingement of product which affects the residence time, various techniques can be employed, including a wiper to clear the impinged product from the wall or a slotted membrane through which the secondary air can be brought in as an air curtain to direct the product downwardly to the coalescer, while, if desired, favorably cooling the melt to prevent degradation and discoloration. Still further, the wall temperature of the chamber may be controlled or multiple drip points provided.

As collected, the melt is cooled by suitable means to a temperature of about or below 140° F., which hardens the melt and defines a dry, solid corn syrup product. This product can be granulated, either with or without the use of food-grade processing aids to control the hygroscopicity and agglomeration of the granulated product. To further control the tendency of the products to agglomerate into an unmanageable mass due to its hygroscopicity, food-grade viscosity-increasing processing aids, such as gums, may be added to the feedstock to increase the sticky temperature of the product. According to an article authored by Galen Downton, Jose L. Flores Luna, and C. Judson King, and entitled "Mechanism of Stickiness in Hygroscopic, Amorphous Powders", *Ind. Eng. Chem. Fundom.*, Vol. 21, No. 4, 1982, temperature, moisture, and viscosity are interrelated for amorphous, hygroscopic powders, and, by increasing viscosity for a given percent moisture, a higher, sticky temperature, or temperature at which the granules stick together, can be obtained. The processing aids to control hygroscopicity may include tricalcium phosphate, dicalciumphosphate, dehydrated silicondioxide, sodium aluminosilicate, calcium or magnesium stearate, maltodextrin, or the like. Granulation preferably takes place in a dehumidified atmosphere, or in the presence of inert gases such as nitrogen or carbon dioxide, to prevent the dry, solid corn syrup from acquiring moisture from the air. The product may be collected and stored in nonpermeable bags or other containers to prevent the product from obtaining moisture from the environment.

It has also been found that, by blending sucrose (sugar) with the corn syrup feedstock, hygroscopicity can be reduced, if not controlled. The foregoing is significant, since sucrose is largely an imported product and hence may be subject to higher costs and restrictions on imports. By blending sucrose with domestically derived fructose, a sweetener can be obtained which is less hygroscopic than pure corn syrup solids, and the sweetener industry is not tied to imported sucrose.

In a further embodiment of the method and apparatus, where the product is presented as a dry solid and not a melt, the product can be separated from the airstream by various techniques, including cyclone separators, bag filters, or the like. For example, condensed milk has been dehydrated by the methods and apparatus according to the present invention, the condensed milk being presented as dry solids at about 200° F. at the chamber outlet. This product can be diverted to cyclone separators or bag houses for removal as desired. Other dried products at 200° F., susceptible to collection by cyclone separators or bag filters are lecithin, biosurfactants, orange juice, tomatoes, lemon concentrate, sweetened condensed milk, condensed milk, soy protein isolate, apple solids (puree), egg whites, egg yolks, whole eggs, vegetable protein hydrolysate, whey protein concentrate, whole blood, soy polysaccharides, aluminum hydroxide, xanthan gum, and other products.

As can be appreciated, the method according to the present invention is capable of dehydrating or removing volatiles from temperature-sensitive or hard-to-handle products. With specific reference to corn syrup, a dry, amorphous corn syrup product can expand the use of corn syrup into other heretofore unavailable markets, increasing the use of corn syrups, such as HFCS or other corn sweeteners. Accordingly, the dry corn syrup product can be made inexpensively, thereby enhancing the entry of corn sweeteners into markets heretofore occupied by sugar or other caloric sweeteners. Further, equipment and methods set forth according to the present invention efficiently dries corn syrup and other products, such as orange juice, orange juice concentrate, and lemon juice concentrate, without deleteriously affecting flavors since dehydration takes place at relative low temperatures. Product degradation for other sensitive products is also avoided.

BRIEF DESCRIPTION OF THE DRAWINGS

These and other features and advantages of the present invention will be better understood with reference to the specification, claims, and drawings wherein:

FIG. 1 is a schematic section view of an apparatus and method according to the present invention;

FIG. 2 is a schematic illustration of another embodiment of the apparatus and method according to the present invention;

FIG. 3 is a schematic illustration of still another embodiment of the present invention;

FIG. 4 illustrates the derivation of dextrose and HFCS products from corn;

FIG. 5 graphically illustrates the viscosity-temperature profile for HFCS products;

FIG. 6 illustrates a method according to the present invention for dehydrating and handling a corn sweetener product;

DETAILED DESCRIPTION

The present invention is broadly directed to methods and apparatus for removing volatiles, such as water or organic solvents, from less volatile components in a composition. The methods and apparatus operate by creating a hot, turbulent, gaseous environment, particulating the composition to increase its surface area, and controlling the temperature, composition, residence time, and acoustic environment relationships to remove volatiles without degrading, burning, or otherwise damaging the product. The turbulent, gaseous environment enables dehydration or concentration to take place quickly at relatively low temperatures, and in an environment which prevents degradation of a product. The invention also includes means for collecting and handling the product.

The methods and apparatus according to the present invention as hereinafter described have successfully been used to dehydrate food products, such as xanthan gum, corn syrups, including high fructose corn syrup (HFCS), fruit pulp and juices (including lemon and concentrated orange pulp and juice), proteins, dairy products, egg products, and others. This dehydration is accomplished without significantly affecting flavor, burning the product, or otherwise chemically degrading the product.

Corn Syrups

A feedstock which has been successfully processed according to the methods and apparatus of the present invention is corn syrup. Corn syrup, as hereinafter understood, means both regular, dextrose-based corn syrups, high-fructose corn syrups (HFCS), or various blends thereof. While the description hereinafter set forth is with reference to dehydration of corn syrups, it is to be understood that many products can be dehydrated or reduced according to the present invention.

Figure 4:
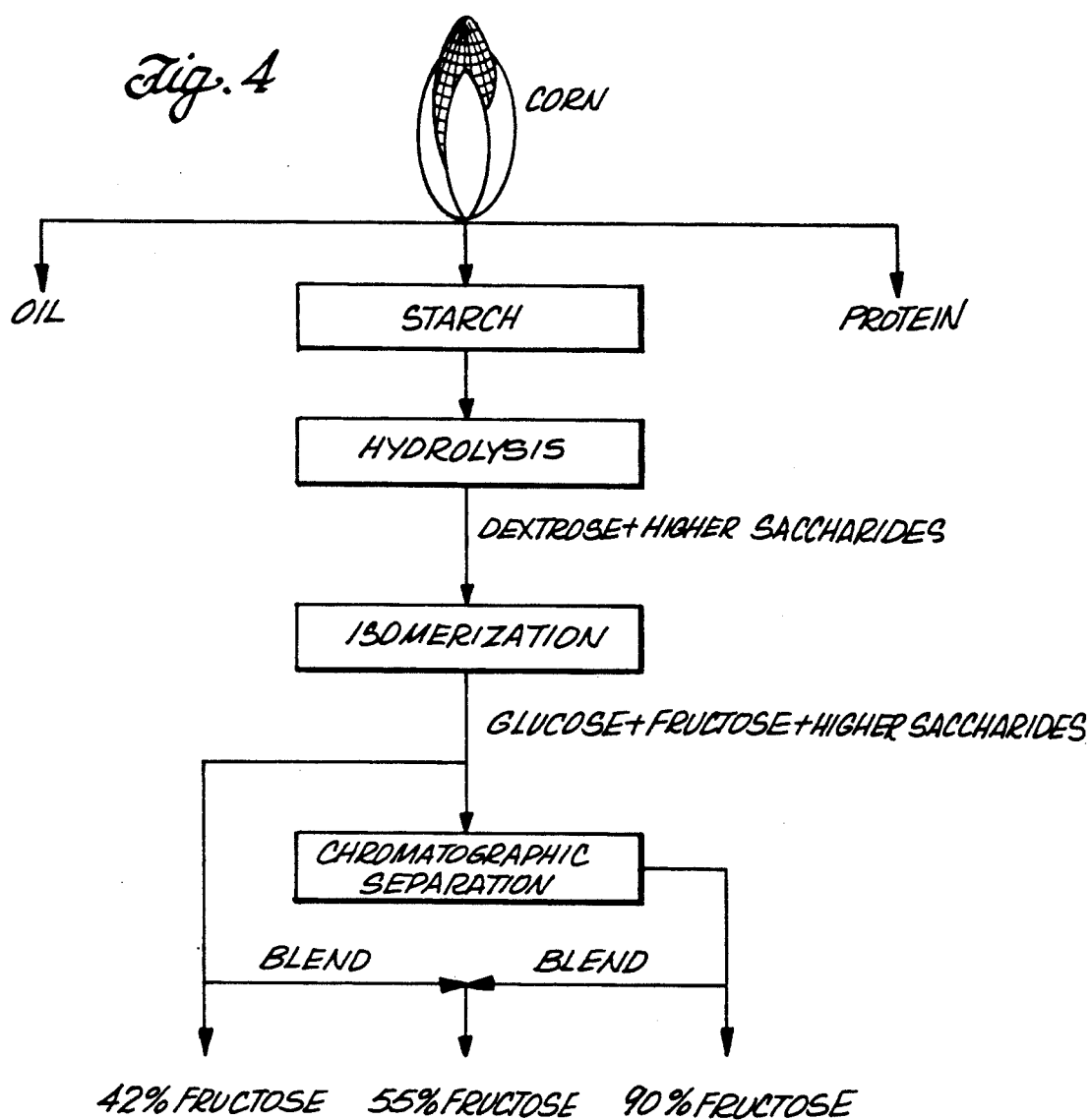

Turning to FIG. 4, the derivation of corn syrups and high-fructose corn syrup (HFCS) from corn as presently practiced in the industry is shown. The corn is processed at a wet mill by known means to separate the corn oil, protein, and corn starch. The corn starch is thereafter hydrolyzed, producing dextrose, an aldose, plus higher saccharides. The extent of hydrolysis can yield low dextrose equivalent (DE) syrups or high DE (95-97 DE) syrups. The dextrose can thereafter be sent through an isomerization column containing immobilized glucose isomerize (an enzyme). From the isomerization column, the output is approximately 42% fructose, 50% dextrose, and 8% higher polysaccharides, as measured on a dry weight basis. If desired, to obtain higher fructose content, fructose and glucose must be separated by a chromatographic separation column.

The separation column consists of an ion exchange resin causing the dextrose and fructose to vary in residence times. Depending upon which resin is used, either fructose or dextrose will emerge from the column first. A small fraction of the feedstock will emerge from the column as 90% fructose, 7% dextrose, and 3% saccharides product, as measured on a dry weight basis. It has been found that, relative to sucrose, the 90% fructose (HFCS) can have a relative sweetness up to 1.8 times that of sugar. If practicable, the 90% fructose (HFCS) can be a desirable and usable end product in view of the fact that, to obtain the desired sweetness, less product need be added. Accordingly, it may be desirable, as an ultimate end product, to dehydrate the 90% HFCS commercially for designated applications. If sweetness comparable to sucrose is desired, the 90% HFCS can be blended with 42% HFCS obtained pursuant to the isomerization step to obtain a 55% HFCS having a sweetness comparable to sugar. For applications such as table sweeteners, a dry, flowable, 55% HFCS would be desirable. Further, since the 55% HFCS would be less expensive than 90% HFCS, economic considerations may point to a 55% HFCS as being a desired product, if obtainable in a dry, pourable form. Typically, the 42% HFCS, 55% HFCS, and 90% HFCS have a solids content of between 55%-80%, the remainder to be represented by water. Accordingly, to produce a dry HFCS product, the water must be evaporated from the HFCS, and preferably the evaporation would occur without significant discoloration, deterioration, or caramelization of the product, while maintaining the carbohydrate composition.

The dextrose corn syrup produced in a dehydrated state may also be usable as an ingredient. Further, the dextrose corn syrup and HFCS may be blended as desired and thereafter dehydrated to produce preferably a dry, flowable product.

Figure 5:
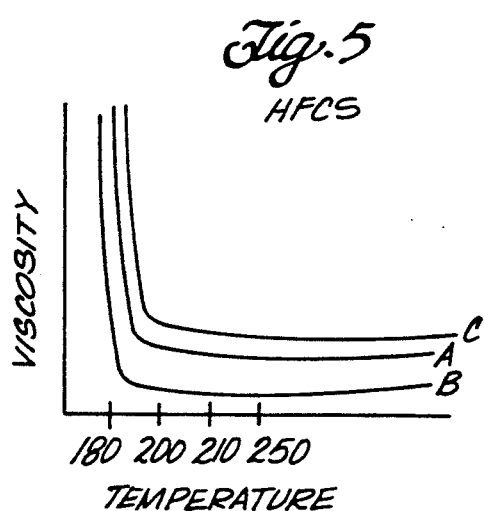

Several properties of corn syrups have contributed to the inability to produce these products in a dry, amorphous form. A first characteristic of most corn syrups is that at about 200° F., the dehydrated corn syrup forms a viscous melt. This is particularly true of the HFCS corn syrups, as opposed to low-percentage DE dextrose base corn syrups, which are solid when dehydrated and are at about 200° F. With reference to HFCS specifically, FIG. 5 illustrates the relationship between temperature and viscosity. The graphic illustration presented in FIG. 5 is merely by way of illustration and is not intended to present a quantitative representation between temperature and viscosity for high-fructose corn syrups. Line C represents the relationship between temperature and viscosity for a 42% HFCS at about 0.5% moisture. As can be appreciated, the viscosity of this product above about 190° F. is rather low, and hence, as a melt, it flows rather freely. However, below about 190° F., the viscosity radically increases, rendering the product less flowable. Line A represents the relationship between temperature and viscosity for a 90% HFCS product at again about 0.5% moisture. Line B illustrates a 90% HFCS product at about 2% moisture. As can be understood, this viscosity-temperature relationship for HFCS must be taken into account in any dehydration process and product handling.

Another characteristic of HFCS is that it is extremely temperature-sensitive. At about 240° F. or above, the fructose tends to degrade into, for example, fructose dianhydrides. This fructose loss or degradation results in a discoloration of the product into a caramel light color, and it results in loss of quality.

Still another consideration for dehydrated HFCS is that it is hygroscopic. Even should a technique be successfully used to dehydrate a high-fructose corn syrup product, steps must be taken during handling and storage to prevent moisture pickup.

Another consideration related to the hygroscopicity of HFCS and other corn syrups is the tendency of the particles of granulated HFCS to stick together over time to form an unmanageable mass. It is believed that the tendency of such particles to stick together is related to the viscosity at the surface of the particles which is, in turn, as stated above, related to temperature. If product viscosity at its surface can be increased, then a higher temperature, hereinafter referred to as the "sticky temperature", would be required to lower the viscosity to a point at which the particles would stick together.

As for corn syrups, particularly HFCS, the foregoing characteristics of hygroscopicity, viscosity, temperature sensitivity, and sticky temperature are related, and hence the dehydration of corn syrups have heretofore baffled those skilled in the art.

With reference to the dehydration of corn syrups, the apparatus and methods according to the present invention will now be described.

Apparatus

Figure 1:
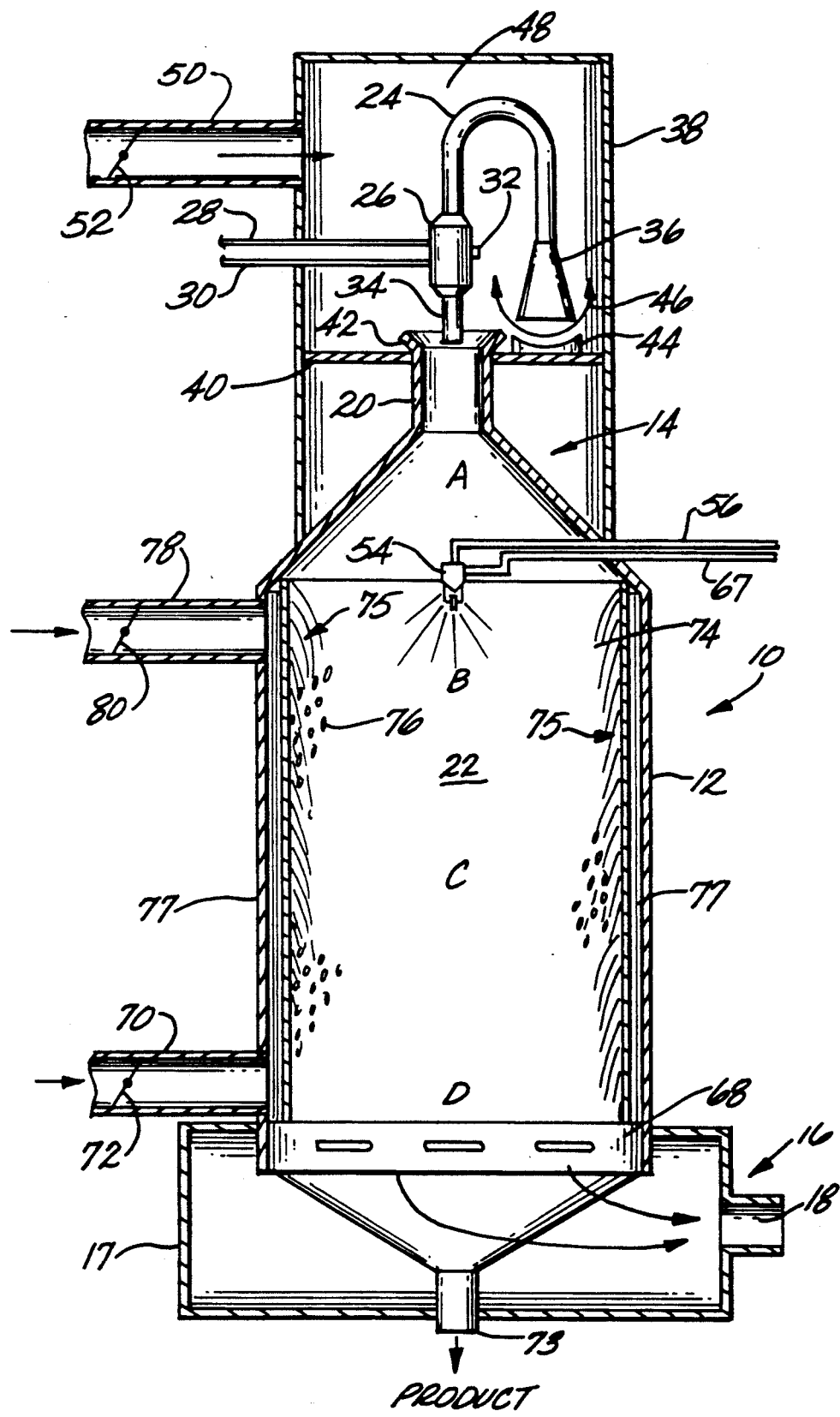

Turning to FIG. 1, one embodiment of an apparatus according to the present invention adapted to function as a dehydrator 10 is shown. The dehydrator 10 has proven satisfactory in drying products, such as corn syrups including HFCS, concentrated milk, and fruit juices, to name but a few. The dehydrator 10 includes a generally closed vessel 12, preferably defined by an upright cylinder having an inlet end 14 and a lower outlet end 16. As shown in FIG. 1, the outlet end 16 may be embodied as a closed base 17 having at a location thereof a discharge opening 18. Opposite the outlet end 16, the inlet end 14 may be conically tapered from an inlet opening defined by an orifice 20. While the orifice 20 may be a simple opening, or the entire inlet end 14 may be open, it has been found that, for purposes which will hereinafter become evident, a somewhat tubular configuration for the orifice, as illustrated in FIG. 1, is preferred. Between the orifice 20 and base 17, a dehydration chamber 22 is defined for the dehydrator 10.

To dehydrate the feedstock, such as corn syrup, means are provided for generating a hot, acoustical environment in the dehydration chamber 22. The environment heats and agitates the feedstock to liberate the moisture therefrom which is carried away from the product through the discharge opening 18. While these means may be embodied as means for supplying hot, desiccating gas to the dehydration chamber 22, and as a acoustic horn for generating the aforesaid acoustical waves,-preferably as shown in FIG. 1, these means are embodied to include a pulse combustor 24 of the type described in U.S. Pat. No. 3,462,955 to Lockwood, the disclosure of which is hereby incorporated by reference.

While the characteristics of the combustor 24 may vary, the following characteristics are given by way of example:
Capacity: 1,000,000 BTU/hr.
Pulse Rate: 250 cycles per second
Temperature at combustor discharge with propane as fuel: 1600° F.–2300° F.

Figure 9A:
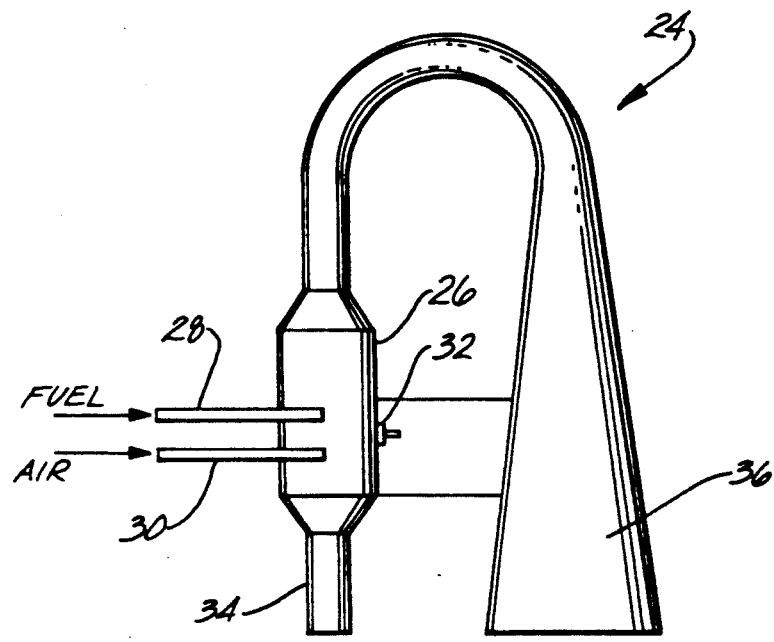
FIG. 9A illustrates a pulse combustor adapted to generate the environment for removing volatiles or dehydration.
Figure 9B:
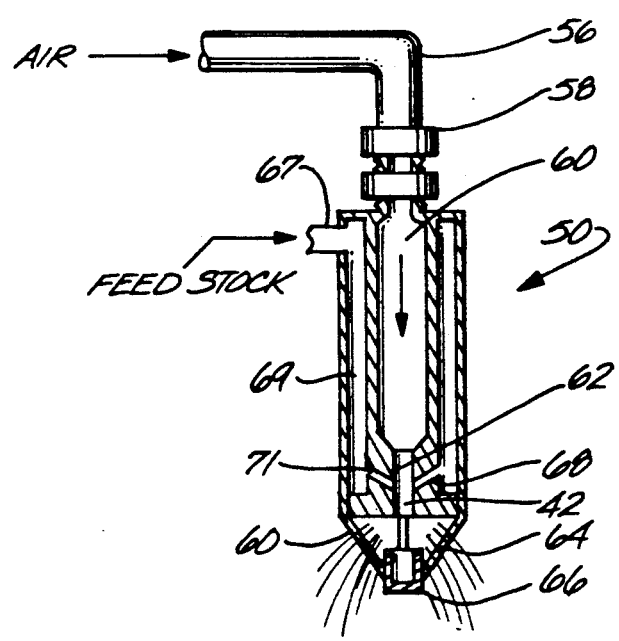
FIG. 9B illustrates a spray nozzle adapted to spray the feedstock as small droplets.

While described in the aforementioned patent, a brief discussion of the combustor 24 will be set forth herein with reference to FIG. 9A. The combustor 24 is essentially comprised of an elongate, hollow tube, open at its ends and turned upon itself in generally a U-shaped configuration. The combustor 24 includes a combustion chamber 26 into which fuel, such as propane, is introduced via a conduit 28. Combustion ignition air is delivered to the conductor by a conduit 30. The fuel and air mixture within the combustion chamber 26 is then ignited with a sparking device shown as spark plug 32. Ignition of the fuel-air mixture within the combustion chamber 26 causes the pressure and temperature of the gases within the combustion chamber 26 to rapidly increase and expand for discharge through the open ends of the combustor 24, defined as the inlet 34 and discharge 36. After the gases expand, the pressure within the combustion chamber 26 drops such that ambient air is brought into the combustion chamber 26 from the inlet 34 for mixture with fuel. After the initial ignition, the high-temperature gases remaining in the combustor 24 provide for self-combustion, and, accordingly, the spark plug 32 need not be operated. Eventually, equilibrium is reached, with the combustor 24 operating in pulses of gas expulsion and expansion and intake of new combustion air and fuel. The frequency of the pulses is determined by the configuration of the combustor 24, but may be about 250 pulses (cycles) per second. Accordingly, the combustor 24 issues from both its inlet 34 and discharge 36 hot combustion exhaust gases at temperatures of between, 1600° F. and 2300° F. and pulsating at or about 250 pulses per second.

Due to the nature of the combustor, sound waves are also issued from the combustor. The sound waves are generated pursuant to the rapid expansion of the products of combustion and the shock waves developed thereby. It has been found that the sound waves are generated in about six octave bands, each having its sound pressures. These octave bands and corresponding sound pressures are set forth, by way of example above, under the heading "SUMMARY OF THE INVENTION". As can be appreciated, the combustor 24 conveniently provides not only a high-temperature gas, but also an environment including pulses of hot gases and sound waves.

To contain the combustor 24, dehydrator 10 includes a generally closed housing 38 disposed to extend up from the inlet end 14 of the vessel 12. The housing 38 may be connected at its lower extremity to the inlet end 14 and may include a medially disposed partition 40 for supporting the orifice 20. As can be seen from FIG. 1, the combustor 24 is suitably supported within the housing 38 such that the inlet 34 is directed downwardly to exhaust into the orifice 20. To direct the exhaust from the inlet 34 and the other gases as hereinafter set forth into the orifice 20, the orifice 20 may be provided with a conical collar 42 at its upper end. It has been found that to prevent unwanted turbulence and hot spots within dehydration chamber 24, the orifice 20 and combustor inlet 34 should be arranged axially with respect to the vessel 12 and its dehydration chamber 22.

As stated above, pulsing, high-temperature gases are emitted from both the inlet 34 and discharge 36 for the combustor 24. To fully utilize the production of these pulsating hot gases, the dehydrator 10 includes a flow-directing trough 44 disposed on the partition 40 spaced from the discharge 36 and arranged to divert the pulsating hot gases in an upwardly direction into the housing 38, as indicated by arrows 46. These hot gases from the discharge 36 circulate through the housing 38 in a mixing chamber 48 defined by the generally closed housing 38 and above the partition 40. These pulsating hot gases are drawn by a venturi effect through the orifice 20 with those gases emitted from the inlet 34 for the combustor 24.

To provide for temperature control for the gases received into the dehydration chamber 22, and to control product residence time, means are provided for admitting primary, tempering air into the housing 38 to mix with the high-temperature gases and to provide air for combustion within the combustor 24. As shown in FIG. 1, these means include a primary air duct 50 which directs ambient, heated, or chilled air into the mixing chamber 48. To control the flow through the primary air duct 50, a suitable control, such as a butterfly valve 52, may be provided. Depending upon the product to be concentrated or dehydrated, the flow through the primary air duct 50 is controlled to achieve a desired temperature at zone A defined at the upper reaches of the dehydration chamber 22 and at the outlet of the orifice 20. The primary air could be filtered and preheated as desired. For dehydrating corn syrups, such as HFCS, it is believed that a desired temperature at zone A is about 300° F. Again, however, this temperature can be adjusted by increasing or decreasing the volume of primary air admitted through the primary air duct 50. The air is mixed with the combustion gas exhausted from the discharge 36 and is further mixed with the discharge from the inlet 34 at the mixing orifice 20.

While the combustor 24 may be arranged, as indicated, to direct the inlet 34 into the orifice 20, it is to be understood that the combustor could be arranged to, instead, direct the discharge 36 into the orifice, or to direct both the inlet and discharge into the orifice. It is believed that greater mass flow is achieved from the inlet 34 of combustor 24, and, hence, the arrangement as indicated in FIG. 1 may be preferred.

To deliver the corn syrup feedstock to the dehydrator 10, and more particularly the dehydration chamber 22, means are provided for particulating the syrup feed as preferably a fine aerosol spray into the chamber at the inlet end 14 and in a direction which is co-current or co-directional with the direction of the gases received into the dehydration chamber 22 through the orifice 20. While co-directional spraying may be preferred, countercurrent spraying can also be employed. With countercurrent spray, the sprayed product quickly reverses direction to flow co-directionally with the gas. With reference to FIGS. 1 and 9, the delivering means includes at least one spray nozzle 54, which receives the feedstock corn syrup under pressure as from a pump or the like. The nozzle 54 is adapted to disperse the liquid corn syrup into droplets having a mean diameter of about 20 microns. It has been found that nozzles of the type manufactured by Sonic Development Corporation, Mahawh, N.J., which handles a variety of flow rates, disperses corn syrup, such as HFCS, into droplets, the diameter of which falls in the range of 2–50 microns. A substantially uniform particle size of about 20 microns is preferred. The particulation of the feedstock into small droplets maximizes the surface area available for removal of moisture and dehydration of the product. With regard to the nozzle, it has been found that sonic atomizing spray nozzles are well adapted for this purpose in that they can produce the desired fine mist from viscous corn syrups and are not sensitive to flow rate variations which occur in the feed rate.

In operation, the nozzle 54 as shown in FIG. 9B is supplied with an atomizing gas which may be steam or air. However, dry air is preferred because it does not add moisture to the process. The atomizing air is supplied to the nozzle from a suitable source, such as a compressor, through a conduit 56 attached to the spray nozzle by a coupling 58. The nozzle 54 has an axial passageway 60 communicating at one end with the conduit 56 and at the other end reducing down to define a smaller diameter axial bore 62. By virtue of the small diameter bore 62, a restriction is provided which accelerates the atomizing air flow to a desired outlet velocity. Spaced from the bore 62 by supports 64 is a cup-shaped resonator 66. The high-velocity atomizing air issued from the bore 62 impinges against the resonator 66 to generate standing shock waves upstream of the resonator 66, which are adapted to break up, atomize, and disperse the syrup feed into the desired droplet size.

Feedstock, e.g., corn syrup, is fed through a conduit 67 to an annular duct 69 arranged about the passageway 60 and generally closed at both ends. Openings 71 deliver the feedstock from duct 69 to the axial bore 62, where it is carried by the atomizing air to the standing shock waves for atomization thereof.

The nozzle 54 is arranged downstream of the combustor 24 and orifice 20, as shown in FIG. 1. The nozzle 54 may be surrounded by thermo-insulating material, or may be determined that the flow rate of the corn syrup and atomizing air is sufficient enough to cool the nozzle during operation thereof. During start-up, water may be passed through the nozzle for cooling. A suitable placement for nozzle 54 is about 30 inches from the combustor inlet 34.

The feedstock is accordingly, via the nozzle 54, sprayed into the dehydration chamber 22 as a fine mist. A pattern of spray typically produced by the nozzle 54 is as a cone, the apex of which is at the nozzle 54. To provide an even spray, it is preferred that the nozzle 54 be arranged axially within the vessel 12 and coaxially with the orifice 20 and combustor inlet 34. Multiple nozzles, if required, may be arranged other than coaxially, such as in a radial pattern.

The corn syrup feedstock sprayed from the nozzle 54 initially flash-dries under the influence of the hot gas and acoustical environment within the dehydration chamber 22. Due to evaporative cooling, the temperature at zones B and C, where the feedstock spray encounters the hot resonating environment, may be about 250° F. or less. Moisture under the driving force of the hot gas and acoustic agitation migrates to the surface of each droplet and quickly evaporates therefrom as the droplet falls by the force of gravity and the impetus of the gases issuing from the orifice 20 toward the vessel end 16. At the outlet end 16, the dehydrated product is collected and processed, as described below. The gases having removed the moisture from the product exit from the dehydration chamber 22 at the discharge opening 18 and are disposed of in an efficient manner, which may include removing the latent heat from the gases for further use in the process.

If desired, a blower (not shown) can be provided to forcibly draw the gases from the dehydration chamber 22 through the outlet opening 18.

The vessel 12 is sized to provide a sufficient residence time for the droplet at the appropriate temperature for dehydration.

As stated above, certain corn syrups, such as HFCS, when substantially anhydrous, e.g., 1% moisture, and at 200° F., are characterized as a dry melt. Therefore, the dehydrated droplets of product approaching the outlet 16 are liquid and flowable. To provide a means for collecting these droplets, the dehydrator 10 may include a coalescer 68. The coalescer 68 includes a multiplicity of impingement points for the droplets, the droplets impinging and coalescing on the surfaces into one, or a plurality, of melt streams which are combined, and the dehydrated product is ultimately recovered at product outlet 73. The gases from the coalescer 68 enter the base 17 and pass to the outlet opening 18.

As stated above, with certain products, notably high-fructose corn syrups or high D.E. corn syrups, the temperature must be maintained sufficiently high to keep the product flowable for collection and removal from the coalescer 68. In addition to the consideration of viscosity, many products, such as HFCS, are temperature-sensitive and, if overexposed to the high temperature, may tend to degrade and damage the product.

To further control the temperature of the dehydrated melt, various secondary control means may be employed. As shown in FIG. 1, one method may be to provide secondary air through a secondary air duct 70 arranged proximate the coalescer 68, flow through the secondary air duct 70 being controlled by a valve 72. The secondary air supplied through duct 70 may be scavenged from the gases emitted from the discharge opening, may be ambient air, or may be filtered and preheated ambient air. With a suitable blower (not shown), the secondary air is provided through the duct 70 into the dehydration chamber 22 proximate the coalescer 68 to control the temperature of the melt collected thereat. For HFCS, it is preferred that the temperature be controlled at the coalescer to about 200° F.±20° F. At 200° F., the dehydrated HFCS collected at the coalescer is flowable, providing for the collection at, and removable from, the coalescer 68. Furthermore, at these temperatures, and the time of exposure during collection and removal from the coalescer 68, the corn syrup composition is maintained, and the product is not degraded or otherwise seriously affected. Secondary control means may not be required where the coalescer 68 is matched to efficiently collect the HFCS droplets.

During dehydration of corn syrups, such as HFCS, it has been found that some of the droplets impinge upon the wall of the vessel residing there, or moving downwardly toward the bottom end 16. In certain circumstances, impingement does not present a problem; however, for certain corn syrups, such as HFCS, impingement may result in overexposure of the product to the high-temperature atmosphere within the dehydration chamber 22, causing discoloration and degradation of the product. Unlike the free-falling droplets which rapidly exit the chamber 22, those droplets which impinge upon the wall of the vessel 12 require additional time to run down the wall to the coalescer 68 or product outlet 73 for removal from the dehydrator 10. The mechanism for wall impingement is not clearly understood; however, it is believed that the larger-sized droplets, having increased momentum due to their mass, may be those that impinge the wall of the vessel 12, while the smaller droplets free-fall to the discharge end 16. Another mechanism operating apart from, or in cooperation with, droplet size is turbulence of the desiccating gas set up within the vessel 12. This turbulence may tend to create eddies, urging the product to impinge the wall. Whatever the mechanism for certain products which are particularly temperature-sensitive, wall impingement can affect product quality and yield.

To control wall impingement, the dehydrator 10 may be provided with a wiper mechanism (not shown) which continually wipes the inside surface of the vessel to urge the wall-impinging product downwardly to the coalescer 68 for collection thereof. Hence, these mechanical means, acting like a wiped film evaporator, can be utilized to quickly remove the sensitive product impinging on the wall to prevent degradation thereof. Another solution may be to provide temperature control for the wall of the vessel 12 to control the temperature of the product impinging thereon, and prevent degradation thereof. Also, multiple drip points may be provided such that the products flowing down the wall encounters the drip points and falls to the coalescer.

Still another approach to reduce or minimize wall impingement is as illustrated in FIG. 1, including means for developing an air curtain 75 down the wall of the vessel 12. According to this embodiment, the dehydrator 10 includes a cylindrical membrane 74 coaxially disposed within the dehydration chamber 22, the membrane 74 including a plurality of perforations or apertures 76. For food-grade products, the membrane 74 would preferably be constructed from stainless steel to facilitate cleaning and disinfection. The apertures 76 may be provided in selective patterns over the membrane 74, or may be continuous. Cooperating with the membrane 74 to develop the air curtain, the dehydrator 10 includes a tertiary air duct 78, the flow of air through which is controlled by a valve 80. The source of air through the tertiary air duct 78 may be from a blower, and the air passage through the duct may be preheated and/or filtered, similarly to that described above with reference to the secondary air duct 70. The membrane 74 has a smaller diameter than that of the vessel 12, and, accordingly, an annulus 77 is defined between the membrane 74 and vessel 12 along the length of the membrane. The tertiary air supplied through the duct 78 enters the annulus 77 and flows into the dehydration chamber 22 through the apertures 76. Upon entering the dehydration chamber 22, the tertiary air is urged by the exhaust gases from the combustor 24 to turn downwardly toward the outlet end 16. To enhance the turning of the tertiary air downwardly, the apertures 76 may be contoured to deflect the tertiary air in the aforesaid downwardly direction to define the air curtain along the inside surface of the membrane 74. To enhance the even generation of the air curtain along the length of the membrane 76, the tertiary air duct 78 may be arranged tangentially with respect to the vessel 12, whereupon the tertiary air enters and swirls downwardly within the annulus 77 feeding the apertures 76 which, in turn, define the air curtain. With the air curtain thusly created along the inside surface of the membrane, droplets which would normally have a tendency to impinge upon the wall of the vessel 12 are, instead, turned downwardly, carried by the air curtain toward the coalescer 68. Hence, impingement is prevented or reduced. Advantageously, the air supplied through the tertiary air duct 78 and apertures 76 can be employed to control product temperature in lieu of supplying air through the secondary air duct 70. By controlling the supply of air to the tertiary air duct 78 with valve 80, temperature of the product at the coalescer 68 can be controlled to prevent degradation of the product collected thereat.

Figure 2:
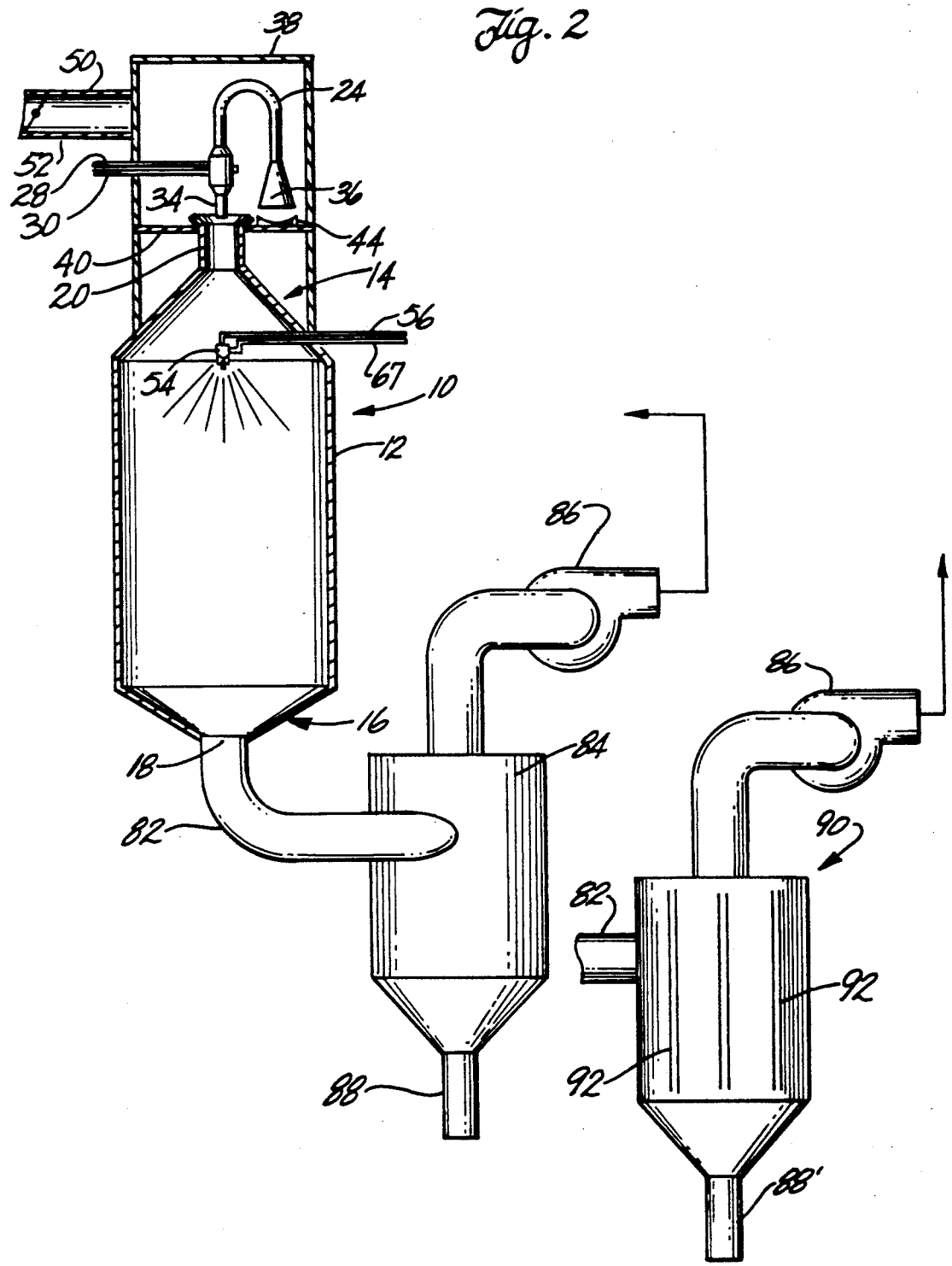

It is to be understood that the membrane and/or coalescer 68 may not be required, depending upon the characteristics of the feedstock. The embodiment of the dehydrator 10 for dehydrating and handling products which are solid, when dehydrated at a temperature or temperatures within the dehydrator, need not include the coalescer or membrane. For example, the dehydrator and handling equipment illustrated in FIG. 2 would be suitable for dehydrating products such as condensed milk, tomatoes, orange juice concentrate, lemon concentrate, and apple puree, to name a few. According to FIG. 2, the dehydrator 10 includes the vessel 12 having an outlet end 16 and inlet end 14. The housing 38 contains the combustor 24, the inlet 34 which discharges through an orifice 20, mixing with the primary mixing air brought in through primary air duct 50 into the housing, producing temperatures at the outlet of the orifice 20 in the range of 300° F. The combustor 24 also generates acoustical waves within the dehydration chamber 22 defined by the vessel 12. The product, for example, condensed milk, is pumped to the nozzle 54 where it is atomized in the manner described above. By virtue of the hot, acoustical environment, and the residence time necessary for the droplets to fall through the vessel 12 to the outlet end 16, the droplets are dehydrated, defining at the outlet end 16 powdered, dehydrated, condensed milk. The dehydrated, powdered, condensed milk is swept from the vessel 12, through the discharge opening 18, into a discharge duct 82, and to, for example, one or more cyclone separators 84. The cyclone separator 84 efficiency is related to the velocity of the gas and particles passing through and, accordingly, if desired, to provide for an induced draft through the cyclone separator 84, an induced draft fan 86 may be provided. The dehydrated, powdered, condensed milk is separated from the desiccating gas at the cyclone 84, the powdered milk falling to a port 88 for removal from the cyclone 84. To increase the efficiency of the overall dehydration process, the discharge from the fan 86 may be used to preheat the primary air or for other purposes.

In lieu of using the cyclone separators 84, the discharge duct 82 may be connected to a bag filter 90 containing filtering surfaces 92 which trap the powdered, condensed milk, but pass the gases. Again, if desired, a fan 86 may be employed to create an induced draft through the bag filter 90. At intervals, the materials are shaken from the filtering surfaces 92 to be collected at a port 88'.

Figure 3:
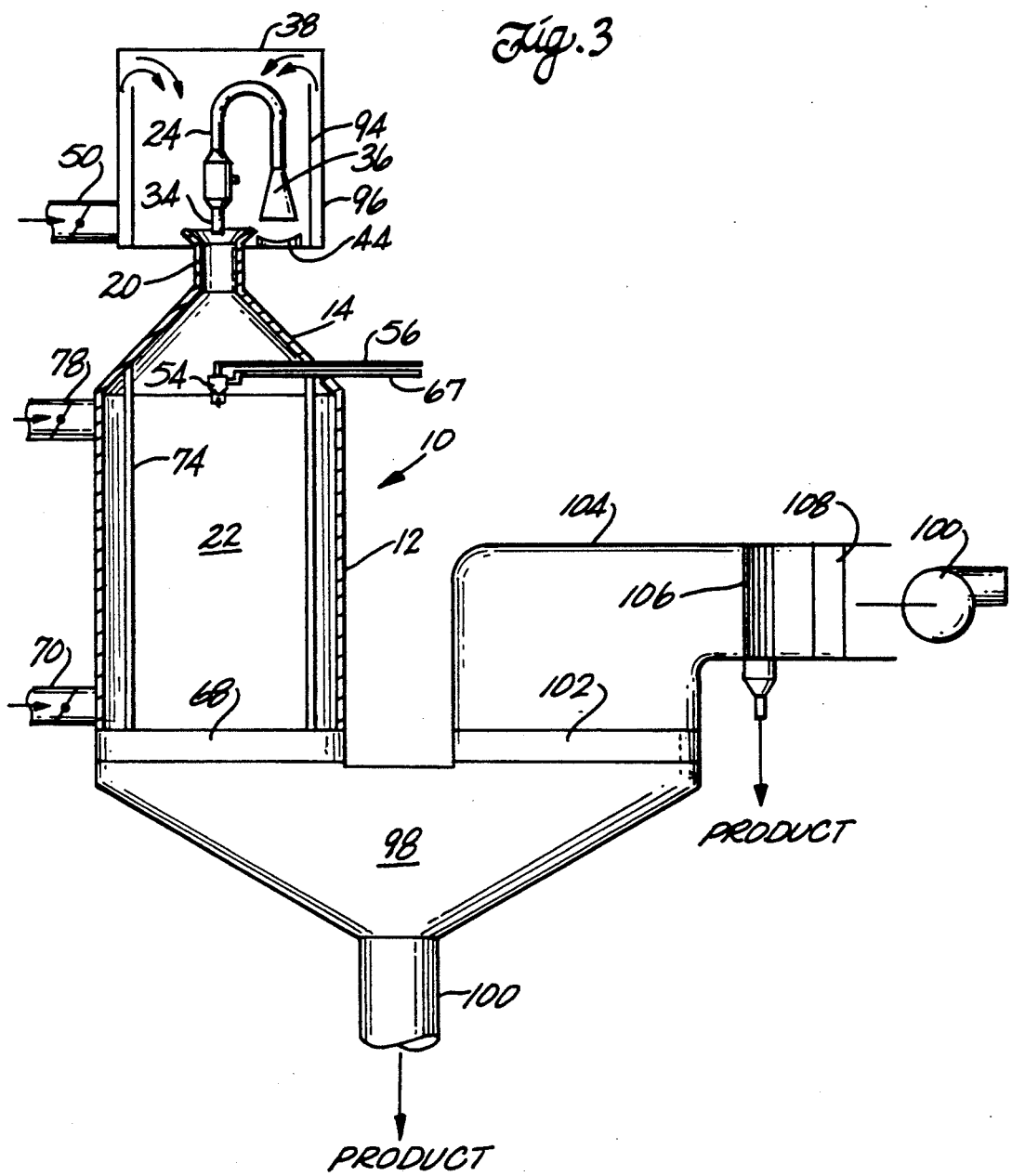

With reference to FIG. 3, still another embodiment of a dehydrator 10 is shown. This embodiment is particularly adapted for dehydrating products which, at temperatures of about 200° F., appear as a melt. As shown, the dehydrator 10 includes the vessel 12, having an inlet end 14 and defining a dehydration chamber 22 as set forth above. A closed combustion chamber 26 houses the combustor 24, the inlet 34 of which discharges through an orifice 20 into the dehydration chamber 22. To control the temperature of the gases admitted into the dehydration chamber 22, the primary duct 50 is provided to supply cooling and mixing air to the housing 38. If desired, a cylindrical wall 94 may define an annular space 96 within the housing 38, the tempering air flowing into the space 96 and over the wall 94 for mixing with the high-temperature gases emitted from the discharge 36 for the combustor 24.

As described, the dehydrator 10 may include the membrane 74 and either or both of the secondary or tertiary air ducts 70 and 78 for admitting cooling air and/or air for forming the air curtain.

To collect the melt, the coalescer 68 is disposed at, and defines, the bottom of the dehydration chamber 22. The product and gases pass through the coalescer 68 which coalesces the anhydrous melt product into larger streams, whereupon it drops into a Y-shaped collection channel 98 and is removed from an opening 100. The gases are directed by the channel 98 to a second coalescer 102, which removes further melt which may be airborne in the gas stream. The cross sectional areas of the coalescer 68 and second coalescer 102 are sized to provide gas velocities for efficient separation of product. The product removed at the second coalescer 102 falls downwardly into the channel 98 for collection from the opening 100. The gases from the channel 98 enter an exhaust duct 104 and are directed through a demister 106 disposed therein. At the demister 106, any remaining product in the gas stream is removed. From the demister 106, the gases having a temperature of about 190° F. may be directed through a heat exchanger 108 adapted for heating one or more of the primary air, secondary, and/or tertiary air. To control velocities through the coalescer 68, second coalescer 102, and demister 106, an induced draft fan 110 may be adapted to draw the gas through the exhaust duct 104. The discharge of the fan 110 may be returned to the dehydrator 10 in the form of primary, secondary, or tertiary air. It is believed that the efficiency of product removal, according to the embodiment of FIG. 3, is enhanced by the addition of a second coalescer and demister.

Figure 6:
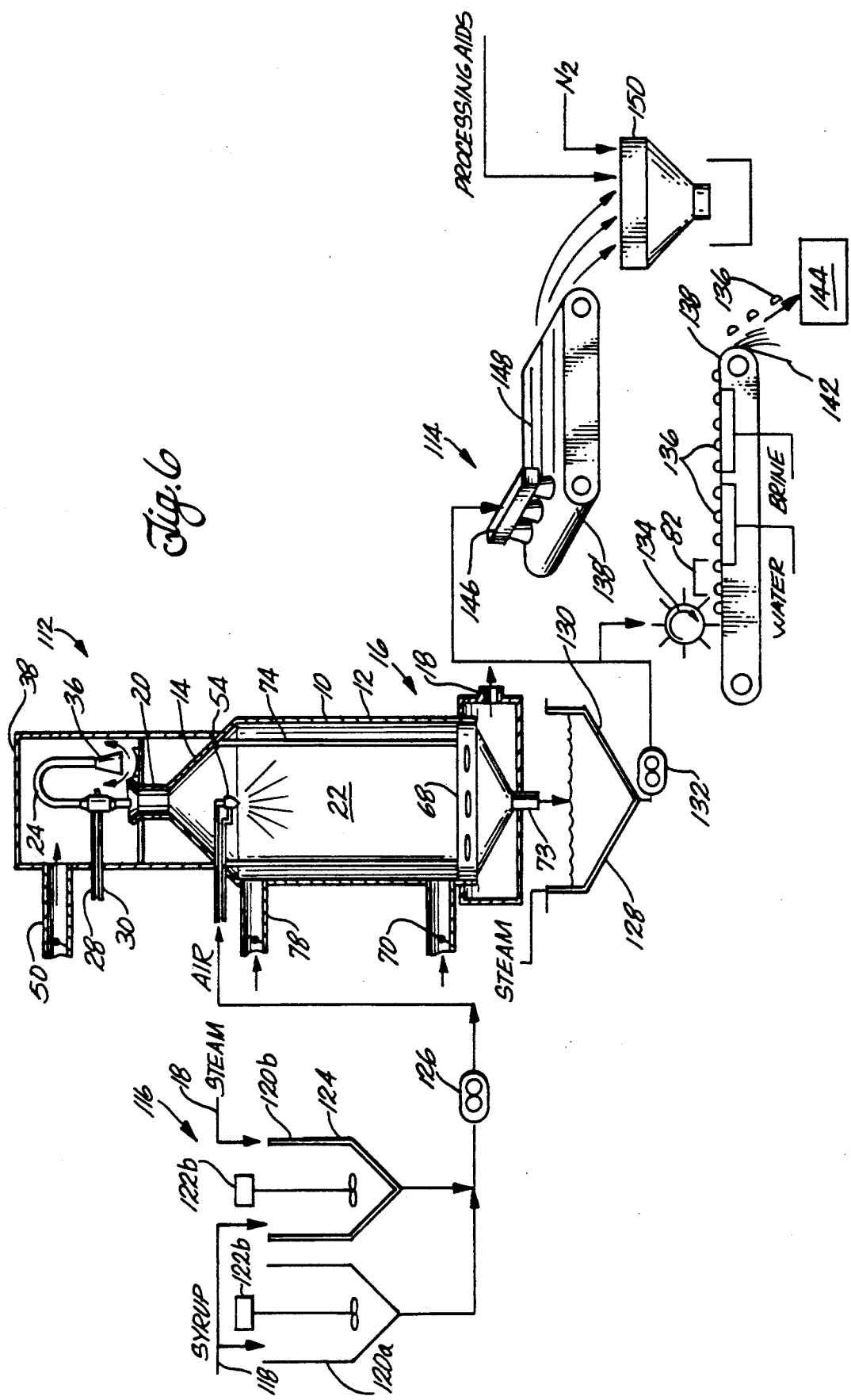

With reference to FIG. 6, an overall embodiment of the apparatus and methods for dehydration and granulation of the product, such as high-fructose corn syrup or other corn syrup, is illustrated. As shown, the process in FIG. 6, includes a dehydration portion, shown generally as 112, a post-treatment portion shown generally as 114, and a pretreatment portion shown as 116. The pretreatment portion 116 may or may not be provided, depending upon the state, i.e., pressure, temperature, presence of solids, and flow rate of the feedstock which may be 42%–90% fructose, 36–97 D.E. corn syrup, and/or blends thereof, or, for that matter, any other suitable product. The supply from, for example, a processing plant, is shown as syrup supply 118. The pretreatment portion 116 may, as alluded to above, not be required if supply 118 is at a desired state. In its most rudimentary embodiment, the pretreatment portion 116 may include a tank 120a adapted to receive the syrup supply 118 and hold an amount of syrup in readiness for dehydration. Tank 120a may be sized to provide a surge capacity so that dehydration can take place uninterrupted at a rate which may be different from the rate of supply 118. Tank 120a may also provide a convenient point at which processing aids, if desired, may be incorporated into the syrup to condition the syrup for dehydration and subsequent handling. Means for agitating the syrups, such as agitators 122a and 122b, are provided on tanks 120a and 120b, respectively, to ensure uniform product feed composition.

For heating the syrup feed to reduce viscosity, tank 120a or a separate tank 120b may be provided with a steam jacket 124.

The syrup retained in either or both of the tanks 120a, 120b is supplied to the dehydration portion 112 by a pump 126. The pump is selected to provide the syrup to the dehydration portion 112 at the desired pressure and flow rate, as determined by the components of the dehydration portion 112.

The dehydration portion 112 includes the apparatus set forth above for dehydrating a syrup feed which may have a solids content of, for example, 71%. To dry the syrup feed, the dehydration portion 112 includes the dehydrator 10, described above with reference to FIG. 1, including the vessel 12, inlet and outlet ends 14 and 16, and the other components set forth above. The dehydrated product, which appears as a melt, is collected at the coalescer 68, wherefrom it drops through the product outlet 73 into a collection vat 128. The vat 128 may include a jacket 130 for hot fluid to maintain the product as a liquid. The hot gases discharged from the dehydrator 10 may be disposed of as by ducting them to the atmosphere, or may be further utilized for heating primary, secondary, or tertiary air. From the vat 128, the melt is transferred by a pump 132, or by gravity, to the post-treatment portion 114. To prevent the melt from hardening in the transfer line, the line may be insulated or jacketed.

The post-treatment portion 114 of the process is adapted to cool, solidify, granulate, and protect the product from moisture pickup. According to one embodiment, the post-treatment portion 114 includes a rotary former 134, which may be intercooled with water or the like. The liquid melt is fed to the former 134 which forms the melt into buttons, ingots, sheets, strips, or pastilles 136 and then dispenses the melt onto a traveling belt 138. The belt 138, which may be of the type used in the candy industry, is stainless steel and is driven to transport the sheets, strips, or pastilles deposited thereon for further processing. On the belt, the melt is cooled as by circulating water in contact with the underside of the belt 138. The partially cooled melt is further cooled by secondary cooling means, which may consist of circulating a chilled brine in contact with the belt 138, cooling the product to a temperature of approximately 60° F., whereupon the product becomes an amorphous solid. The speed of the belt 138 is selected such that suitable heat transfer can be obtained to harden the melt. At the end of the belt, the hardened melt is scraped from the belt with a doctor blade 142 and is collected in a bin 144 for packaging or for subsequent granulation.

Alternatively, or additionally, the melt from the vat 128 may be sent to a casting head 146 (FIG. 6), which casts the melt in long strips onto a belt 138' similar to that described above. Along the belt, the strips cool into rods 148 which are broken off from the belt 138' for further processing, as required.

To granulate the solid corn syrup, it is fed to a grinder 150. To purge any moisture from the grinder 150 prior to introduction of the solid product, the grinding space may be flushed with a dry gas, such as air, nitrogen, carbon dioxide, or the like. Upon introduction of the product into the grinder, which may be an auger-type grinder, dry gas continually flushes the grinding chamber for cooling and for maintaining the dry atmosphere. If desired, liquid nitrogen or the like may be admitted contemporaneously with the solid product for grinding to remove heat and maintain the dry atmosphere. It has been found that the heat of grinding, if not removed, will cause the solid products to soften and plug the grinder. The ground product may be thereafter sent through a sieve to remove the fines which are believed to contribute to caking of the ground product. Sieving should also take place in a dry atmosphere to prevent moisture pickup of the product.

As stated above, dehydrated corn syrups are extremely hygroscopic, and hence, care must be taken in packaging and handling of the material to limit or prevent caking. If desired, food-grade processing aids may be added during or after grinding to the product to limit or prevent caking. Suggested processing aids would be tricalcium phosphate, dicalcium phosphate, silicon dioxide, sodium aluminosilicate, calcium or magnesium stearate, maltodextrin, or the like. Of course, it is to be understood that other processing aids could also be added to the product to limit or reduce caking.

Alternatively, the dehydrated corn syrup may be encapsulated with, for example, powdered sucrose, sucrose, or the like.

Figure 7:
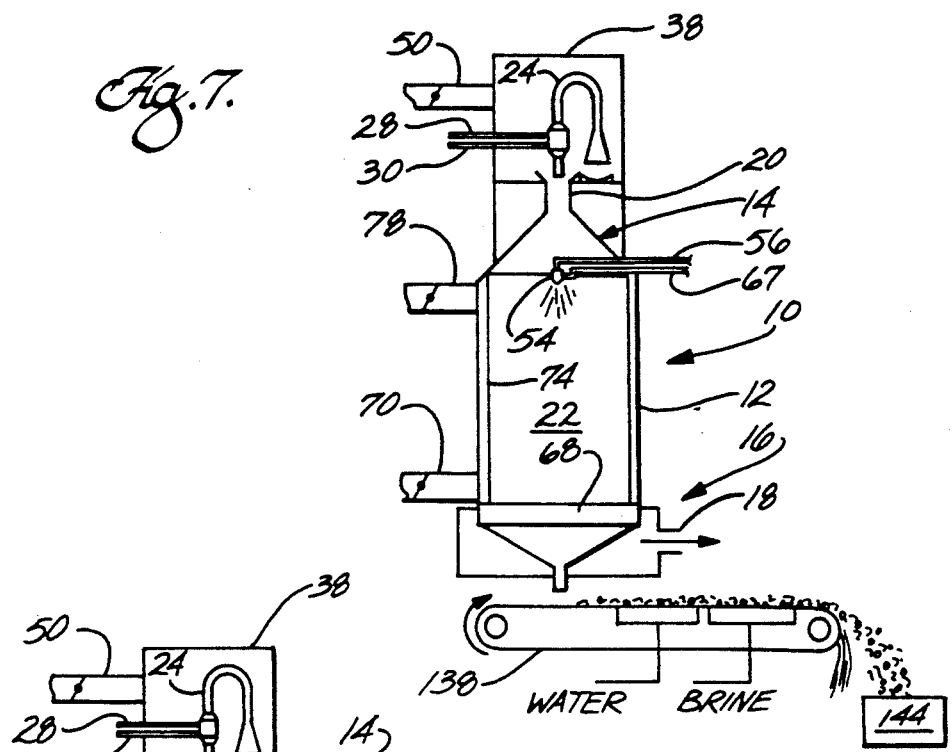
FIG. 7 illustrates a further embodiment for dehydration and collection of particularly corn sweetener products.
Figure 8:
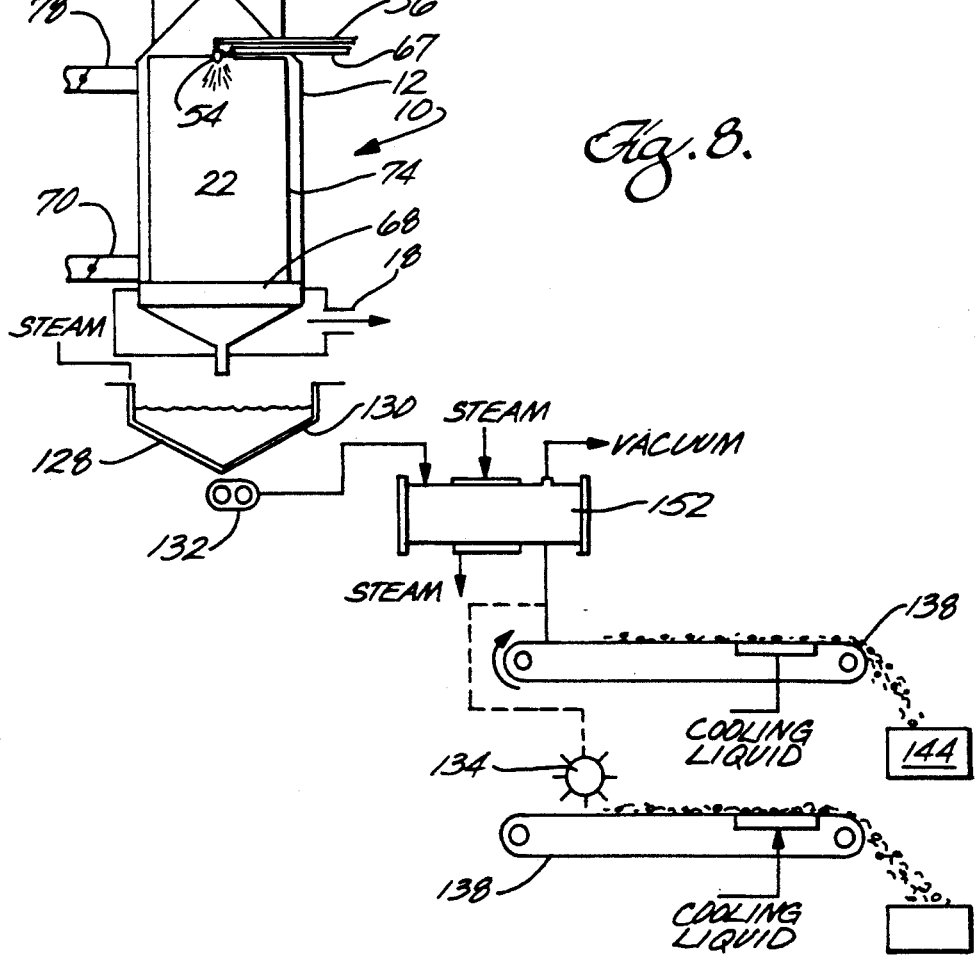
FIG. 8 illustrates still another embodiment of a method for dehydrating and handling a corn sweetener product.

With reference to FIGS. 7 and 8, further embodiments of the apparatus and methods according to the present invention are shown. According to FIG. 7, the collected product from the dehydrator 10 is deposited directly upon the belt 138, whereupon it is cooled and removed for subsequent granulation. According to the embodiment of FIG. 8, the melt collected in the vat 128 may be sent to an evaporator 152 to remove any further moisture and, from the evaporator, deposited on either belt 138, where it is cooled, or dropped in the former 134, which deposits the melt onto belt 138 for cooling and removal in the manner described above. To remove any remaining moisture, the product may also be subjected to microwaves.

While the foregoing description has been set forth with regard to a particular embodiment of the dehydrator 10, it is to be understood that it can be modified without departing from the spirit and scope of the invention. For example, the outlet end 16 for the dehydrator 10 may be entirely open, the material collected at the coalescer, coalescing and dropping in a random fashion into the collection vat 128 or directly onto a cooling media, such as the belt as described above.

Method

Generally speaking, with reference to the apparatus discussed above, the method according to the present invention is directed to a process for removing volatile components from less volatile components present in a feedstock. The method includes providing the chamber 22, which has at one end the orifice 20 and at the other end a discharge 18. The feedstock is particulated or sprayed into the chamber 22, and a hot gas is directed through the orifice 20 into the chamber 22, passes through the chamber 22, and is removed therefrom at an outlet. In conjunction with a hot gas, acoustical waves are generated in the chamber 22 to agitate the particulated droplets, which move co-directionally with the gas to the outlet 18. The hot gas and acoustical waves create an environment to remove the volatile components to reduce the product to less volatile components. Finally, the process includes collecting the less volatile components.

With the broad concepts of the method according to the present invention set forth above, more specific details will be hereinafter set forth with reference to particular products which have been dehydrated pursuant to the method and with the apparatus set forth below.

HFCS

HFCS has been dehydrated with a 1,000,000 BTU/hr. combustor operating at about 45% capacity and using a dehydration vessel 12 having a 3-foot diameter and an axial length of about 8 feet from the bottom of the orifice 20 to the coalescer 68. The size of the orifice was 7⅛ inches in diameter with an axial length of 10 inches.

Tempering air was admitted through the primary duct 50 to achieve a temperature at Zone A of about 400° F. Spraying the HFCS into the chamber at about one pound per minute and into droplets, the mean diameter of which is about 20 microns, the following temperature profile been obtained.

Corn Syrups/Sucrose Blends

As stated above, it has been found that mixing sucrose with HFCS, and perhaps other corn syrups or blends thereof, controls, or at least reduces, the hygroscopicity of the dehydrated product. Accordingly, blends of 42 HFCS and 10%, 15%, 20%, 25%, and 50% sucrose have been dehydrated according to the methods and apparatus of the present invention. It is believed that to date no others have produced amorphous blends of corn syrups and sucrose as sweeteners. According to test results, the following conditions in the dehydrator identified above were found.

TABLE 2

| PRODUCT | % SOLIDS/ ADDITIVES | TEMPERATURE ZONE C °F. | TEMPERATURE ZONE D °F. | TEMPERATURE DISCHARGE 18 °F. ± 20 | PERCENT MOISTURE IN DEHYDRATED PRODUCT |
|---|---|---|---|---|---|
| 42 HFCS[1] | 10% sucrose | 260–280 | 220–230 | 210 | 1.8 |
| 42 HFCS[1] | 15% sucrose | 260–280 | 220–230 | 210 | 0.5 |
| 42 HFCS[1] | 20% sucrose | 260–280 | 220–230 | 210 | 1.3 |
| 42 HFCS[1] | 25% sucrose | 260–280 | 220–230 | 210 | 0.6 |
| 42 HFCS[1] | 50% sucrose | 260–280 | 220–230 | 210 | 1.0 |

[1]coalescer collection.

TABLE 1

| PRODUCT | % SOLIDS/ ADDITIVES | TEMPERATURE ZONE C °F. | TEMPERATURE ZONE D °F. | TEMPERATURE DISCHARGE 18 °F. ± 20 | PERCENT MOISTURE IN DEHYDRATED PRODUCT |
|---|---|---|---|---|---|
| 90 HFCS[1] | 50 | 260–280 | 220–230 | 210 | 0.5 |
| 90 HFCS[1] | 70 | 260–280 | 220–230 | 210 | 1.3 |

[1]coalescer collection.

The length, diameter, and gas throughput of the dehydration chamber 22 defines a residence time which, under these conditions, should be about 4 seconds or less. At a one-pound-per-minute feed, the product removed at the product outlet 73 after analysis was found to contain 0.5% moisture and, hence, was almost entirely dehydrated. After drying, the product was cooled to solidify and was thereafter ground and sieved and, if desired, mixed with food-grade processing aids to control caking.

The same process was followed for dehydration of HFCS and dextrose corn syrup blends and for 62-95 DE dextrose-base corn syrups themselves.

It has been found that dilution of the product with water to reduce the percent solids enhances drying in many instances. This observation was particularly striking since the addition of water to a product to be dehydrated would appear to be inconsistent. While the mechanism for enhancing dehydration to lower percentages of moisture is not completely understood, it is believed that diluting the feedstock may reduce viscosity and enhance particulation and thereby promote dehydration.

Other Products

Other products which have been dried in the 1,000,000 BTU/hr. combustor test unit are set forth below in the table, along with pertinent temperatures, percent solids, and the percent moisture found to exist in the dehydrated product. It is to be understood that these products are set forth by way of example only since, as discussed above, the dehydrator 10 according to the present invention could be used to dry many other products.

TABLE 3

| PRODUCT | % SOLIDS/ ADDITIVES | TEMPERATURE ZONE C °F. | TEMPERATURE ZONE D °F. | TEMPERATURE DISCHARGE 18 °F. ± 20 | PERCENT MOISTURE IN DEHYDRATED PRODUCT |
|---|---|---|---|---|---|
| 80 HFCS[1] | 50 | 260–280 | 220–230 | 210 | 1.2 |
| 55 HFCS[1] | 50 | 260–280 | 220–230 | 210 | 0.7 |
| 55 HFCS[1] | 70 | 260–280 | 220–230 | 210 | 1.5 |
| 42 HFCS[1] | 50 | 260–280 | 220–230 | 210 | 0.5 |
| 42 HFCS[1] | 70 | 260–280 | 220–230 | 210 | 1.5 |
| 63/43 D.E.[2] | 50 | 200 | 180 | 165 | 3.0 |
| 42/43 D.E.[2] | 50 | 200 | 180 | 165 | 5.0 |
| 36/43 D.E.[2] | 50 | 200 | 180 | 165 | 5.0 |
| Protein Hydrolysate[2] | 51 | 240 | 220 | 210 | 3.5 |
| Sweet & Cond. Milk[2] | 60 | 175 | 160 | 145 | 5.0 |
| Sweet & Cond. Milk[2] | 50 | 175 | 160 | 145 | 5.0 |
| Condensed Milk[2] | 50 | 175 | 160 | 145 | 5.0 |
| Tomato[2] | 20 | 165 | 160 | 145 | 6.5 |

TABLE 3-continued

| PRODUCT | % SOLIDS/ ADDITIVES | TEMPERATURE ZONE C °F. | TEMPERATURE ZONE D °F. | TEMPERATURE DISCHARGE 18 °F. ± 20 | PERCENT MOISTURE IN DEHYDRATED PRODUCT |
|---|---|---|---|---|---|
| Tomato[2] | 14 | 165 | 160 | 145 | 6.5 |
| Orange Concentrate[2] | 65 | 175 | 180 | 165 | 3.0 |
| Orange Concentrate[2] | 50 | 165 | 170 | 160 | 5.0 |
| Lemon Concentrate[2] | 50 | 200 | 210 | 190 | 3.0 |
| Apple Puree[2] | 25 | 225 | 200 | 190 | 5.0 |

[1]coalescer collection.
[2]cyclone or baghouse collection.

Other products which can be dried are yeast, fermentation residues, vegetable gums, fine chemicals, food additives, flavoring agents, and pharmaceuticals.

Of particular interest is the ability of the apparatus and methods according to the present invention to dehydrate vegetable and fruit extracts, such as orange juice and lemon juice concentrates, to name but a few. Due to the low-temperature dehydration, the dehydrated product was not degraded and did not lose flavor.

Other Considerations

While stated above and illustrated in the drawings, co-directional introduction of the feedstock into the dehydrator 10, i.e., in the same direction of the gases entering from the orifice 20, has proven to provide satisfactory results. It is to be understood, however, that orienting the nozzle to spray in other directions may also prove successful. For example, co-directional spraying, due to the turbulence and eddies set up within the dehydration chamber 22, may result in product being carried back and collecting and clogging the nozzle 54. Countercurrent spraying may avoid this problem.

Due to the time-temperature conditions within the combustor, the production of carbon monoxides and nitrogen oxides is minimized.

With the apparatus and methods disclosed in referring to FIGS. 1-9B, residence time of about 4 seconds at 200° F. appears to provide sufficient drying of the HFCS products to moisture levels at or below 1%. As far as HFCS is concerned, experience has shown that a final moisture of less than 1% is preferred, if not required.

Figure 10:
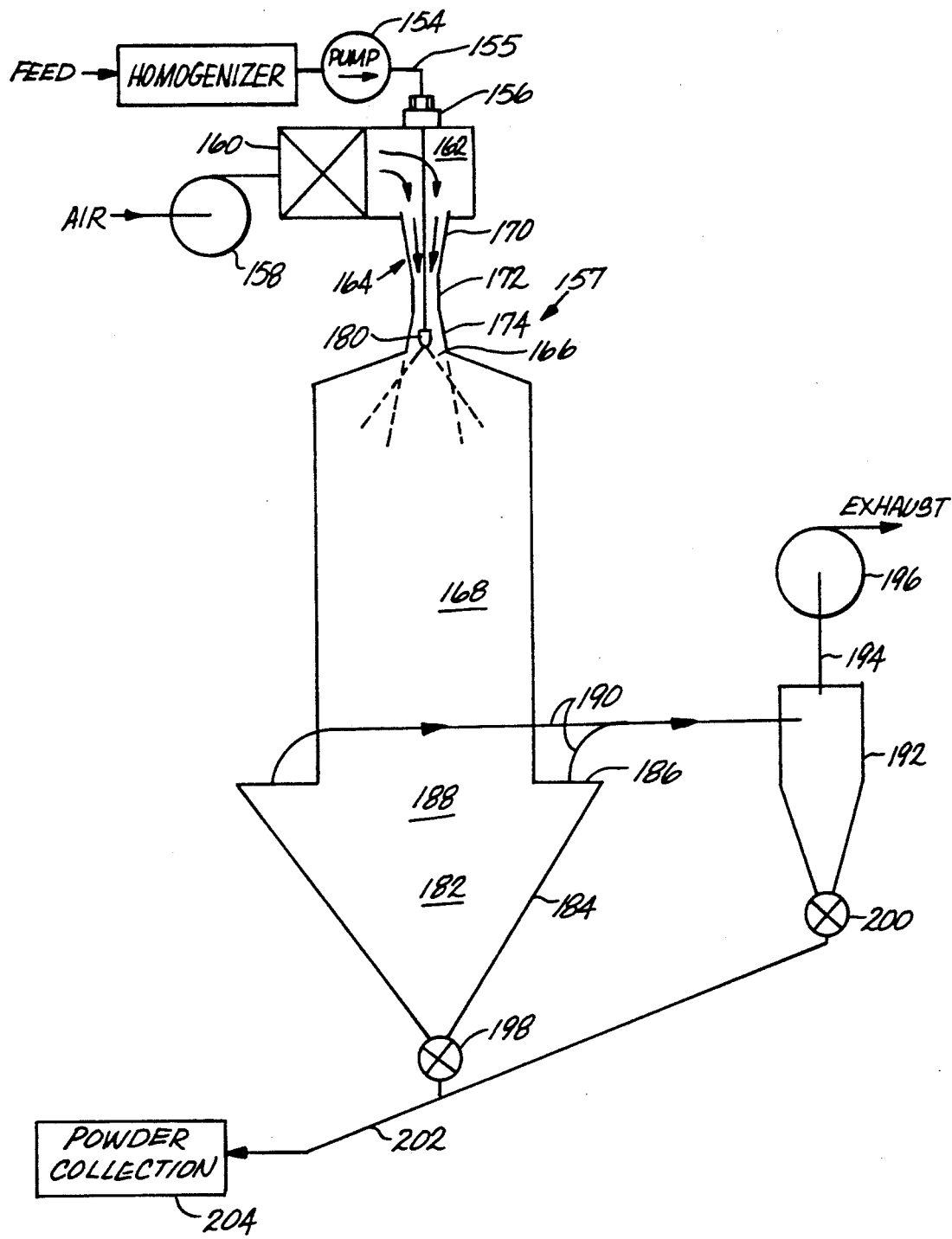
FIG. 10 is schematic and diagrammatic of the presently preferred embodiment of the invention using a venturi tube to generate the turbulent gaseous environment and a spray nozzle in the venturi to spray feedstock droplets into the turbulent gas.

Referring to FIG. 10, which shows the presently preferred embodiment and method of the invention, feedstock passes through a homogenizer 153 (which may be bypassed if the feedstock does not contain a fibrous material or the like which requires comminution) and through a supply pump 154 into a supply line 155, which passes through an adjustable packing gland 156 mounted in the upper end of a spray dryer 157.

A supply blower 158 delivers air or other suitable drying gas through a heat exchanger 160 to a plenum chamber at the upper end of the spray dryer. A venturi tube 164 connects the lower end of the plenum chamber 162 to an inlet 166 in the top of a cylindrical drying chamber 168. The top of the drying chamber diverges from the lower end of the venturi tube, and is of frustoconical shape with an included angle of more than about 120°.

The venturi tube includes a frustoconical, downwardly converging portion 170, which terminates at its lower end at the upper end of a vertical cylindrical throat 172, which terminates at its lower end at the upper end of a downwardly diverging portion 174, which is frustoconical in shape.

Different venturi-tube proportions and arrangements may be used, depending on the product dried, operating conditions, and the nature of the drying gas. The diameter of the throat is preferably between ¼ and ½ of the inlet diameter of the converging portion at its widest point. The included angle of the converging portion is between about 15° and about 35°. The included angle of the diverging portion of the venturi tube is between about 2° and about 12°, and its length is between about 2 and about 9 times the diameter of the throat. Although not shown, the plenum chamber, venturi tube, and drying chamber can all be provided with conventional thermal insulation to conserve heat.

The lower end of supply line 153 terminates in a spray nozzle 180, which may be of conventional type, such as the two-fluid nozzle described above with reference to FIG. 9B. For simplicity, the gas feed for the dual nozzle is not shown in FIG. 10. A two-fluid nozzle is important for spray-drying viscous feedstock or fibrous products (fruit pulps, tomatoes, onions, and the like), which are also preferably comminuted by a mill or homogenizer before being pumped to the spray nozzle. For relatively clear feedstock, and which has a relatively low viscosity (say, substantially below 300 cps), a single-fluid nozzle may be used. In any event, the discharge opening or openings (not shown in FIG. 10) at the lower end of the nozzle are located symmetrically with respect to the longitudinal axis of the venturi tube, and in the diverging portion of the venturi tube so that the nozzle discharge openings are downstream of the throat by a distance equal to at least the diameter of the throat. Preferably, that distance is several throat diameters. Our work to date indicates that the discharge opening of the nozzle should be at, or only slightly upstream of, the end of the diverging portion of the venturi tube, because this is where maximum turbulence is encountered. Under preferred operating conditions, the drying gas is delivered at a rate such that the Reynolds number is greater than 3000 in the vicinity of the transition from the outlet of the diverging portion of the venturi tube.

Preferably, feedstock is sprayed from the nozzle in the form of a cone with an included angle greater than that of the included angle of the diverging portion of the venturi tube, and is preferably between 10° and 100° greater. For example, if the diverging portion of the venturi tube has an included angle of about 5°, the included angle of the spray from the nozzle is between about 20° and 70°, so the conical spray from the nozzle is directed outwardly into the downwardly flowing, hot, turbulent gas from the discharge of the venturi tube. The hot gas tends to focus or deflect the conical spray into a conical pattern with an included angle smaller than that of the spray as it leaves the nozzle. This prolongs mixing of the sprayed droplets in the turbulent zone of hot gas and reduces tendency for incompletely dried product to stick on the interior surfaces of the drying chamber.

Thus, with the nozzle located at the transition from the discharge end of the venturi tube to the spray dryer, as shown in FIG. 10, the droplets sprayed from the nozzle are driven into, and carried along with, the most turbulent portion of the hot gas leaving the venturi tube for drying and further atomization. This second atomization is especially important for drying high-viscosity (e.g., greater than 300 cps) feedstock, or feedstock that includes fibrous matter. For example, citrus pulp is high in viscosity and is fibrous. Therefore, pumping it is difficult, even at a total solids content of only 15%. Conventional atomizing technology produces a "cottonwood" effect on the feedstock so that the spray consists of individual fibers that are, in effect, elongated particles that contain bound moisture. That moisture has not been satisfactorily removed with prior art spray-drying processes, and it frequently migrates to the surface later through capillary action, which changes the desirable physical characteristic of the product.

This invention solves the "cottonwood" effect by milling the feedstock before spraying and by using the two-fluid nozzle with the discharge opening located in the drying gas stream at the point where the drying gas has a velocity and turbulence that disintegrates material which tends to form "cottonwood" fibers. This secondary atomization effect ruptures the fibers and releases the bound moisture, while increasing the ratio of the surface area to mass of the droplets. The result is that compressed air or gas in the two-fluid nozzle performs the initial atomization, while the feed liquid is suspended in the gas stream, and the turbulent conditions of the gas leaving the venturi tube further atomizes the product while it is still suspended in the gas. When using the two-fluid nozzle, the liquid feedstock is supplied to the nozzle at a pressure between about 10 and about 20 psi, and the gas is supplied to the nozzle at a pressure between about 20 and about 100 psi.

For liquid feedstock of relatively low viscosity, say, well below 200 cps, a single-fluid spray nozzle, which may be of conventional type, may be used. In which case, the feedstock may be supplied to the nozzle at a pressure as high as needed, including up to 4000 psi, to get the required drop size.

In engineering terms, the dryer of this invention operates at high Reynolds numbers (i.e., in the range of 3000 to 4000, or higher) to create vigorous turbulence, which produces secondary atomization and improved evaporation efficiency.

As a result of the high-speed, intimate mixing of the sprayed droplets with the turbulent hot gas, which may be at a temperature between 150° and 800° F., a large part, or all, of the required drying takes place in the first 0.2 to 1.0 second after the sprayed liquid droplets leave the spray nozzle. The velocity of the hot gas in the vicinity of the spray nozzle discharge outlet is in the range of 550–1000 feet per second. This permits relatively high temperatures to be used for fast drying without damage to many products.

The advantages of this kind of operation is that it produces products with improved color, flavor, texture, solubility, and nutrition. In addition, the process of this invention operates at a lower cost because it evaporates about 0.85 pounds of water per pound of dry air versus 0.055 pounds of water per pound of dry air with other systems.

Final drying and equilibration of the product occurs as it settles in the drying chamber 168 on its way to a collection chamber 182 in a downwardly converging frustoconical housing 184 having a circular top 186 with a circular inlet opening 188. The diameter of the circular top of the collection chamber is substantially larger than the diameter of the cylindrical drying chamber, to form an annular "dead zone" in the upper end of the collection chamber. Exhaust lines 190, connected to "dead zone" in the upper portion of the collection chamber, lead to a cyclone separator, which has its central discharge gas duct 194 connected to an exhaust blower 196.

Dried product flows down through valves 198 and 200 in the lower ends of the collection chamber and cyclone separator, respectively, and is delivered through a product line 202 to a powder collection unit 204.

Although not shown, the drying apparatus described with respect to FIG. 10 can be used in combination with the coalescer described above with respect to FIGS. 6–8 for drying amorphous products, such as high-fructose corn syrup.

While we have shown and described certain embodiments of the apparatus, methods, and products, including a dehydrated, amorphous corn syrup product, blends, and a corn syrup/sucrose blend, the invention is subject to many modifications without departing from the spirit and scope of the claims set forth herein. For example, multiple spray nozzles may be required for higher product throughput, and various other configurations of product collection and processing can be used.

We claim:

1. A dehydrator comprising:

an elongated, substantially upright vessel having an inlet at its upper end and an outlet at its lower end, said vessel defining a dehydration chamber;

an orifice in the vessel inlet;

a discharge opening at the vessel outlet;

means for generating and directing hot gases at a temperature above about 145° F. through the orifice, through the chamber and out the discharge opening;

means for generating acoustical waves in said chamber, said hot gases and acoustical waves defining a dehydrating environment in the chamber;

a spray nozzle in the chamber downstream from the orifice and above the vessel outlet arranged to spray a substantially conical spray pattern of a liquid product to be dehydrated into the chamber downstream of the orifice as droplets, the droplets encountering the dehydrating environment and dehydrating;

an elongated and substantially upright annular membrane in the chamber between the inlet and outlet and having a substantially vertical longitudinal axis to provide a substantially vertical annular membrane wall in the chamber to receive droplets of at least partially dehydrated liquid product from the spray nozzle, the annular wall being permeable to air;

means for supplying air to the exterior of the annular wall so the supplied air flows through the permeable annular wall and into the chamber to form an interior annular air curtain which impedes impingement of droplets against the interior surface of the permeable annular wall; and means for separating the dehydrated product from the environment.

2. The dehydrator of claim 1 which includes means for defining an air curtain along the wall of the chamber to direct the product downwardly.

3. The dehydrator of claim 1 wherein the permeable annular wall has perforations configured to direct air downwardly.

4. The dehydrator of claim 1 wherein the spray nozzle produces droplets having a mean diameter of about 20 microns.

5. The dehydrator of claim 1 wherein the chamber has a height to provide a droplet residence time in the environment of about 3-8 seconds.

6. The dehydrator of claim 1 wherein the separating means includes a coalescer disposed at the bottom of the chamber.

* * * * *

UNITED STATES PATENT AND TRADEMARK OFFICE
CERTIFICATE OF CORRECTION

PATENT NO. : 5,209,821
DATED : May 11, 1993
INVENTOR(S) : Alexander J. Shaw; Jay S. Marks; Hayes E. Gahagan It is certified that error appears in the above-indentified patent and that said Letters Patent is hereby corrected as shown below:

On the title page:

[56] References Cited, U.S. PATENT DOCUMENTS, please insert the following references:
-- 3,157,359  11/64  Fortman...........239/4
   3,922,189  11/75  Penders...........159/Dig.28
   4,002,524   1/77  Iverson et al.....159/4.01
   4,183,145   1/80  Piterskikh et al..159/4.01
   4,226,668  10/80  Ferguson..........159/4.02
   4,935,209   6/90  Pfoutz............203/99 --.

OTHER PUBLICATIONS

-- Downton et al, "Mechanism of Stickiness in Hygroscopic, Amorphous Powders," Ind. Eng. Chem. Fundam., vol. 21, No. 4, 1982, pp. 447-451 --.

In the Specification

Column 9, line 64, before "preferably" delete the hyphen.

Column 10, line 38, after "between" delete the comma.

UNITED STATES PATENT AND TRADEMARK OFFICE
CERTIFICATE OF CORRECTION

PATENT NO. : 5,209,821
DATED : May 11, 1993
INVENTOR(S) : Alexander J. Shaw; Jay S. Marks; Hayes E. Gahagan It is certified that error appears in the above-indentified patent and that said Letters Patent is hereby corrected as shown below:

Column 17, line 6, change "1 26" to -- 126 --.

Column 19, line 29, after "profile" insert -- at the various zones within the dehydration chamber have --.

Signed and Sealed this

Fifteenth Day of November, 1994

Attest:

BRUCE LEHMAN

*Attesting Officer*  *Commissioner of Patents and Trademarks*